United States Patent
Melville et al.

(10) Patent No.: US 11,828,983 B2
(45) Date of Patent: Nov. 28, 2023

(54) PHOTONICS CHIPS INCLUDING CAVITIES WITH NON-RIGHT-ANGLE INTERNAL CORNERS

(71) Applicant: GlobalFoundries U.S. Inc., Malta, NY (US)

(72) Inventors: Ian Melville, Highland, NY (US); Nicholas Polomoff, Hopewell Junction, NY (US); Thomas Houghton, Marlboro, NY (US); Koushik Ramachandran, Wappingers Falls, NY (US); Pallabi Das, Bangalore (IN)

(73) Assignee: GlobalFoundries U.S. Inc., Malta, NY (US)

( * ) Notice: Subject to any disclaimer, the term of this patent is extended or adjusted under 35 U.S.C. 154(b) by 33 days.

(21) Appl. No.: 17/577,162

(22) Filed: Jan. 17, 2022

(65) Prior Publication Data
US 2023/0228940 A1      Jul. 20, 2023

(51) Int. Cl.
G02B 6/12      (2006.01)
G02B 6/10      (2006.01)
G02B 6/122     (2006.01)
G02B 6/13      (2006.01)

(52) U.S. Cl.
CPC ............. *G02B 6/1228* (2013.01); *G02B 6/13* (2013.01); *G02B 2006/12061* (2013.01)

(58) Field of Classification Search
CPC ............... G02B 6/1228; G02B 6/13; G02B 2006/12061; G02B 6/136
USPC ............................................. 385/14
See application file for complete search history.

(56) References Cited

U.S. PATENT DOCUMENTS

| | | | |
|---|---|---|---|
| 6,888,989 B1 * | 5/2005 | Zhou ..................... | G02B 6/423 385/14 |
| 8,855,452 B2 | 10/2014 | Andry et al. | |
| 9,324,682 B2 | 4/2016 | Marchena et al. | |
| 2016/0291265 A1 | 10/2016 | Kinghorn et al. | |
| 2019/0324203 A1 | 10/2019 | Bayn et al. | |
| 2019/0384002 A1 * | 12/2019 | Lambert .............. | H04B 10/505 |

OTHER PUBLICATIONS

Zhang et al., "III-V-on-Si photonic integrated circuits realized using micro-transfer-printing," APL Photonics 4, pp. 110803-1-110803-10; DOI: 10.1063/1.5120004 (2019).
Bhaskar et al., "Large-area femtosecond laser milling of silicon employing trench analysis," Applied Physics; Systems and Control; DOI: 10.1016/j.optlastec.2020.106866; pp. 1-23 (2020).
Y. Bian et al., "3D Integrated Laser Attach Technology on 300-mm Monolithic Silicon Photonics Platform," 2020 IEEE Photonics Conference (IPC), pp. 1-2, DOI: 10.1109/IPC47351.2020.9252280 (2020).

* cited by examiner

*Primary Examiner* — Kaveh C Kianni
*Assistant Examiner* — Hung Q Lam
(74) *Attorney, Agent, or Firm* — Thompson Hine LLP; Anthony Canale

(57) ABSTRACT

Structures for a cavity included in a photonics chip and methods of fabricating a structure for a cavity included in a photonics chip. The structure includes a substrate, a back-end-of-line stack having interlayer dielectric layers on the substrate, and a cavity penetrating through the back-end-of-line stack and into the substrate. The cavity includes first sidewalls and second sidewalls, and the second sidewalls have an alternating arrangement with the first sidewalls to define non-right-angle corners.

20 Claims, 8 Drawing Sheets

US 11,828,983 B2

1

PHOTONICS CHIPS INCLUDING CAVITIES WITH NON-RIGHT-ANGLE INTERNAL CORNERS

BACKGROUND

This disclosure relates to photonics chips and, more specifically, to structures for a cavity included in a photonics chip and methods of fabricating a structure for a cavity included in a photonics chip.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Factors such as layout area, cost, and operational overhead may be reduced by the integration of both types of components on the same chip.

A laser source may be integrated on the photonics chip. In that regard, a cavity may be formed in the back-end-of-line stack and the substrate, and the laser source may be inserted into the cavity and attached to the substrate. A conventional laser cavity is rectangular in shape with right-angle internal corners. Internal stresses and strains in the back-end-of-line stack and the substrate can be concentrated at the right-angle internal corners of the laser cavity. The concentrated stresses and strains can induce damage and lead to catastrophic failure through mechanisms such as cracking and delamination.

Improved structures for a cavity included in a photonics chip and methods of fabricating a structure for a cavity included in a photonics chip are needed.

SUMMARY

In an embodiment of the invention, a structure includes a substrate, a back-end-of-line stack including a plurality of interlayer dielectric layers on the substrate, and a cavity penetrating through the back-end-of-line stack and into the substrate. The cavity includes a first plurality of sidewalls and a second plurality of sidewalls, and the second plurality of sidewalls have an alternating arrangement with the first plurality of sidewalls to define a plurality of non-right-angle corners.

In an embodiment of the invention, a method includes forming a back-end-of-line stack including a plurality of interlayer dielectric layers on a substrate, and patterning a cavity penetrating through the back-end-of-line stack and into the substrate. The cavity includes a first plurality of sidewalls and a second plurality of sidewalls, and the second plurality of sidewalls have an alternating arrangement with the first plurality of sidewalls to define a plurality of non-right-angle corners.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
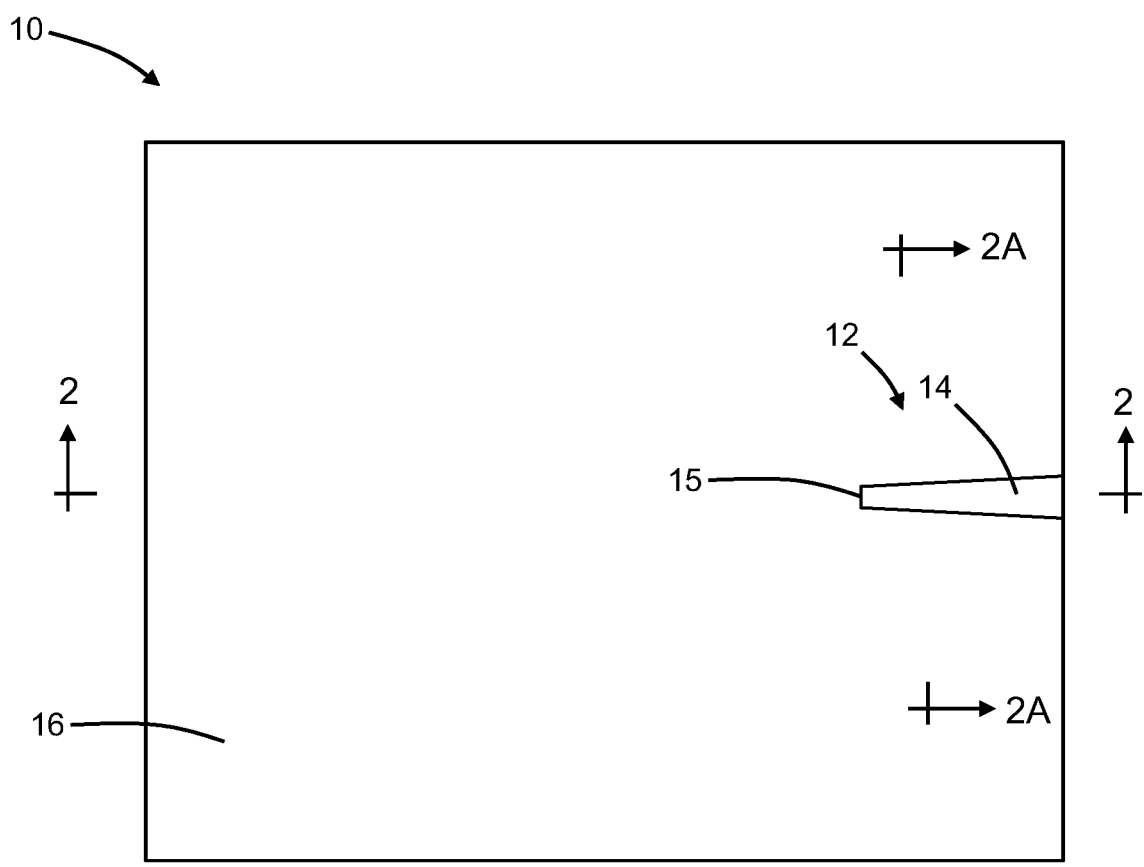
FIG. 1 is a top view of a structure at an initial fabrication stage of a processing method in accordance with embodiments of the invention.
Figure 2:
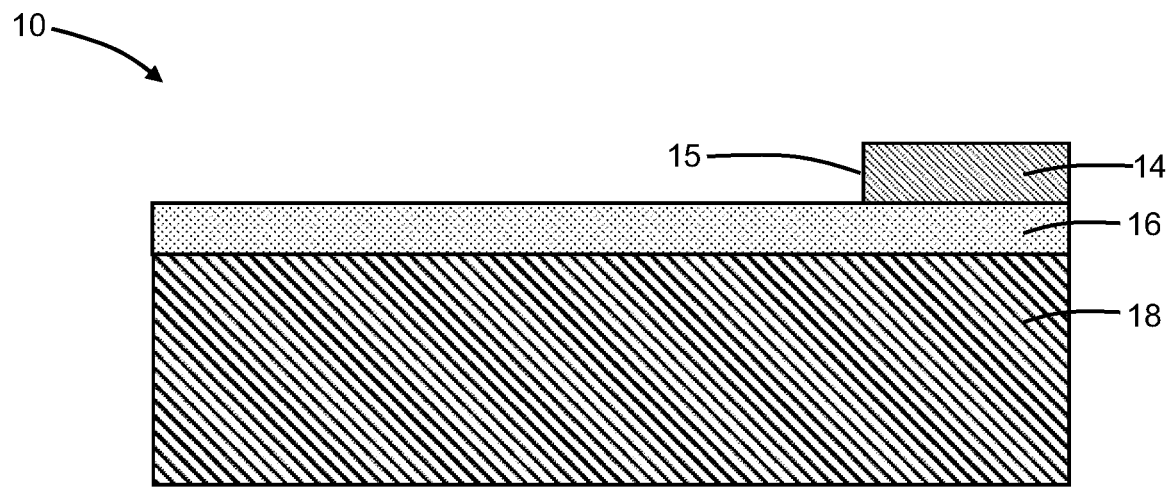
FIG. 2 is a cross-sectional view taken generally along line 2-2 in FIG. 1.
Figure 2A:
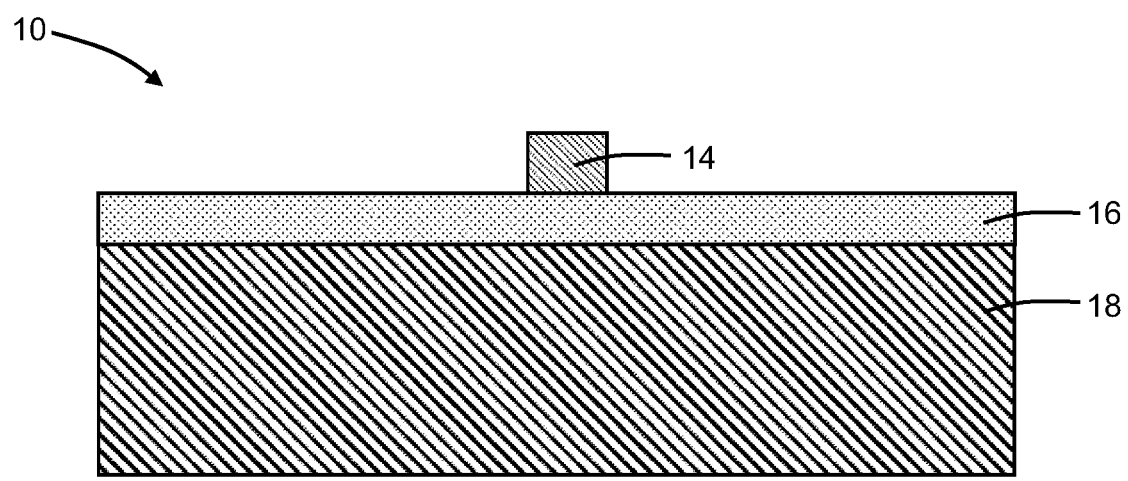
FIG. 2A is a cross-sectional view taken generally along line 2A-2A in FIG. 1.

With reference to FIGS. 1, 2, 2A and in accordance with embodiments of the invention, a structure 10 for a photonics chip includes a waveguide core 12 that may be positioned over a dielectric layer 16. The waveguide core 12 may be comprised of a semiconductor material, such as single-crystal silicon. In an embodiment, the semiconductor material may originate from a device layer of a silicon-on-insulator substrate that further includes a buried oxide layer providing the dielectric layer 16 and a substrate 18 comprised of a semiconductor material, such as single-crystal silicon. The waveguide core 12 may be formed by patterning the device layer with lithography and etching processes. In an embodiment, the waveguide core 12 may be positioned in direct contact with the dielectric layer 16.

The waveguide core 12 may include an inverse taper 14 that defines a spot-size converter capable of coupling light of a given mode from a light source, such as a laser, to other optical components on the photonics chip. As used herein, an inverse taper refers to a tapered section of a waveguide core characterized by a gradual increase in width along a direction of mode propagation from a light source. The inverse taper 14 may have a narrow end 15 defining a facet that is eventually arranged proximate to the light source and a wide end that is connected to another section of the waveguide core 12 used to route the light to optical components on the photonics chip. The gradually-varying cross-section area of the inverse taper 14 may support mode transformation and mode size variation associated with mode conversion when receiving light from a light source such as a laser.

Figure 3:
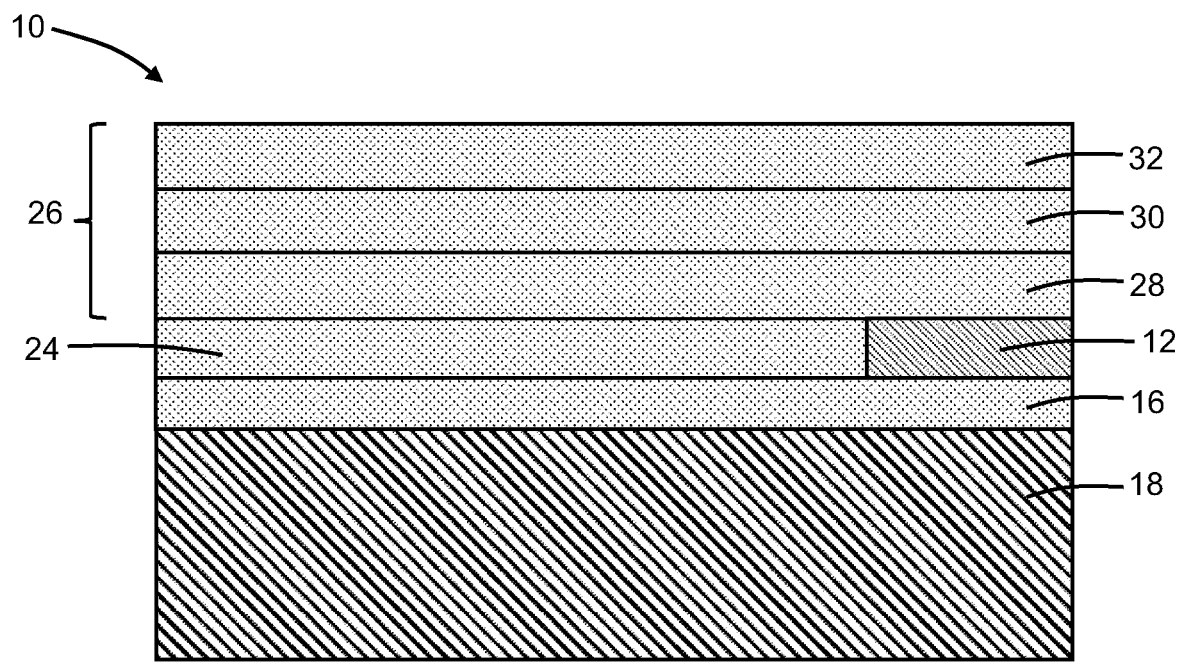
FIGS. 3, 3A are cross-sectional views of the structure at a fabrication stage subsequent to FIGS. 2, 2A.
Figure 3A:
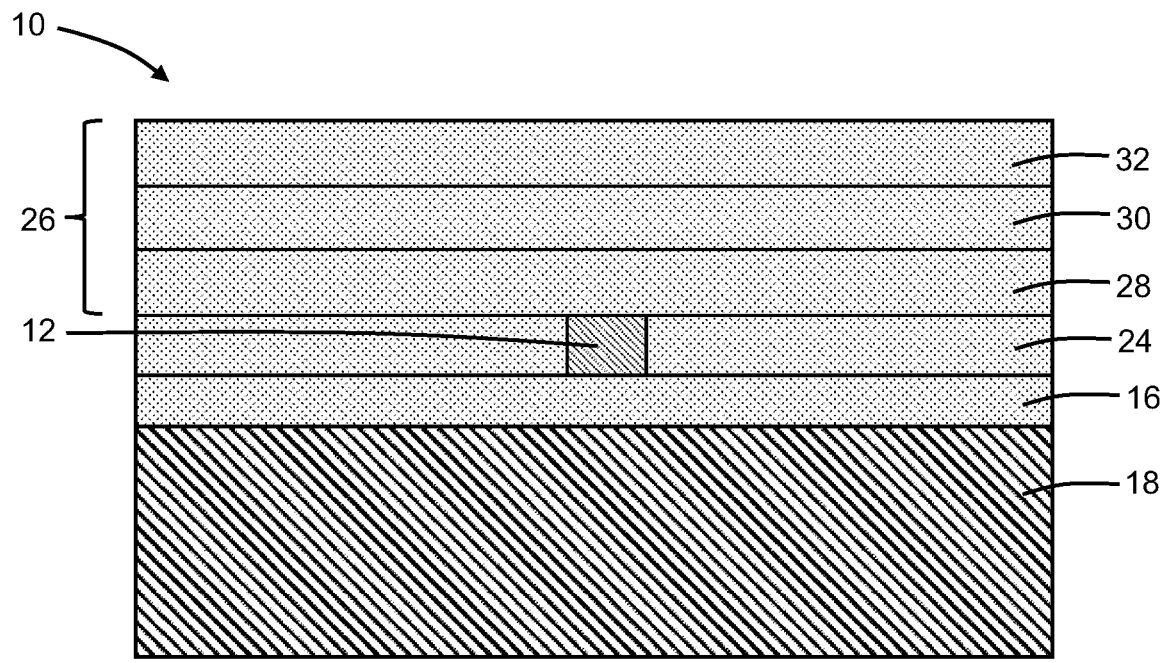

With reference to FIGS. 3, 3A in which like reference numerals refer to like features in FIGS. 2, 2A and at a subsequent fabrication stage, a dielectric layer 24 may be formed over the waveguide core 12 and the dielectric layer 16. The dielectric layer 24 may be comprised of silicon dioxide that is deposited by chemical vapor deposition and planarized with chemical-mechanical polishing. The dielectric layer 24 may provide low-index cladding adjacent to the sides of the waveguide core 12.

A back-end-of-line stack 26 may be formed by back-end-of-line processing that includes multiple wiring levels that are positioned over the dielectric layers 16, 24 and waveguide core 12. The back-end-of-line stack 26 includes multiple interlayer dielectric layers 28, 30, 32 that are stacked in a vertical direction and that contribute to the formation of the wiring levels. Each of the interlayer dielectric layers 28, 30, 32 of the back-end-of-line stack 26 may be comprised of a dielectric material, such as silicon dioxide, silicon nitride, a low-k dielectric material, or an ultra-low-k dielectric material, that is deposited by, for example, chemical vapor deposition. The number of interlayer dielectric layers 28, 30, 32 may vary depending upon the number of wiring levels in the back-end-of-line stack 26. In the representative embodiment, the interlayer dielectric layer 28 may be positioned directly over the waveguide core 12 and dielectric layer 24, the interlayer dielectric layer 30 may be positioned directly over the interlayer dielectric layer 28, and the interlayer dielectric layer 32 may be positioned directly over the interlayer dielectric layer 30.

Figure 4:
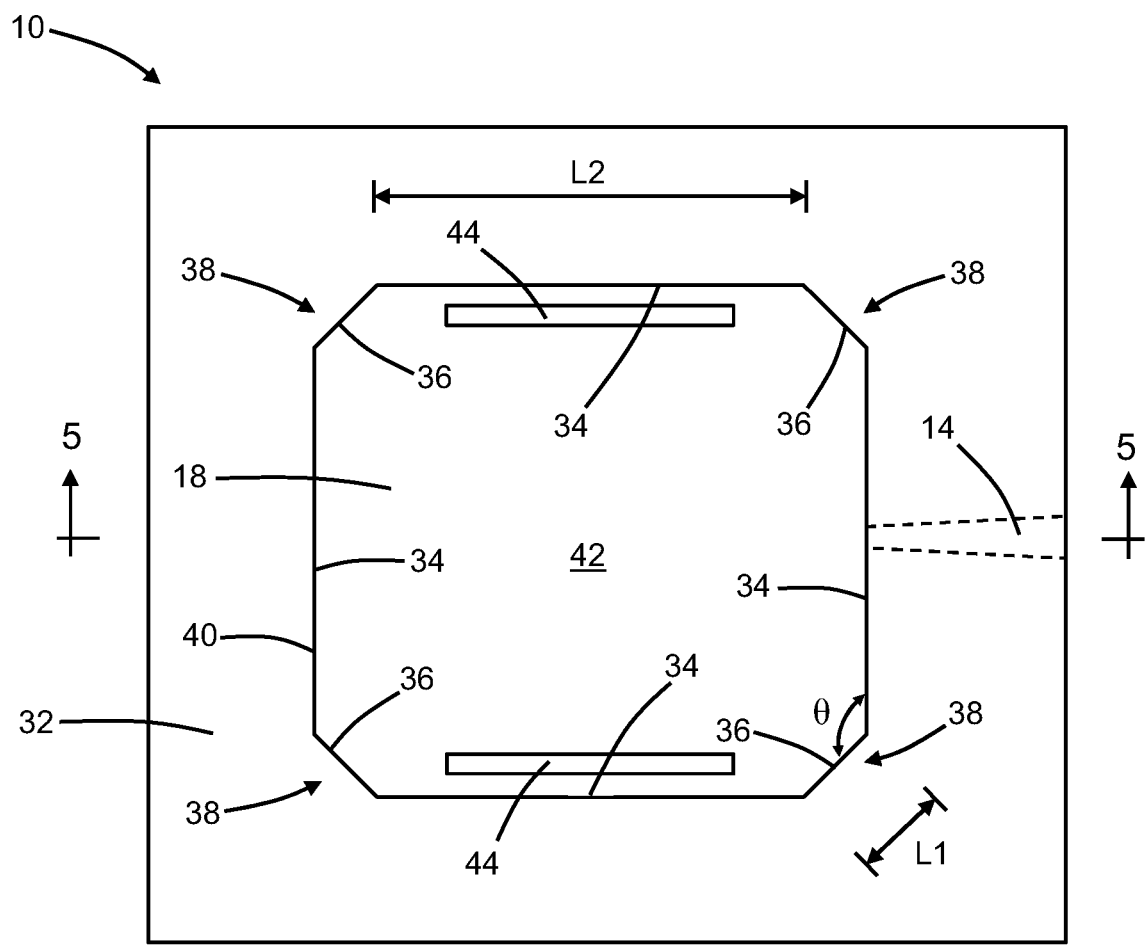
FIG. 4 is a top view of the structure at a fabrication stage subsequent to FIGS. 3, 3A.
Figure 5:
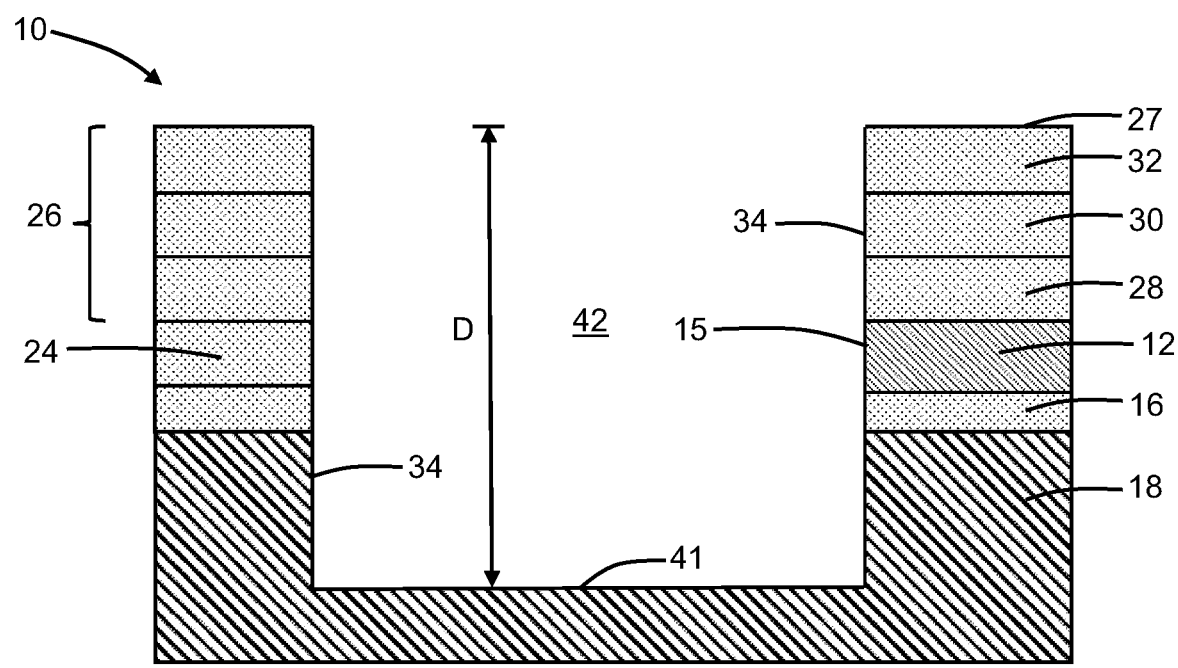
FIG. 5 is a cross-sectional view taken generally along line 5-5 in FIG. 4.

With reference to FIGS. 4, 5 in which like reference numerals refer to like features in FIGS. 3, 3A and at a subsequent fabrication stage, a cavity 42 is formed that penetrates fully through the interlayer dielectric layers 28, 30, 32, fully through the dielectric layer 24, fully through the dielectric layer 16, and to a given depth into the substrate 18. The cavity 42 may be formed by one or more lithography and etching processes. The back-end-of-line stack 26 has a top surface 27 adjacent to the rim of the cavity 42.

The cavity 42 includes sidewalls 34 and sidewalls 36 that are arranged about, and surround, the cavity 42. The sidewalls 34 have an alternating arrangement with the sidewalls 36 about the perimeter of the cavity 42 to define non-right-angle internal corners 38 (i.e., non-ninety-degree inside corners). In that regard, each sidewall 36 connects an adjacent pair of sidewalls 34 in the alternating arrangement. The narrow end 15 of the inverse taper 14 is positioned adjacent to one of the sidewalls 34 and, in an embodiment, the inverse taper 14 may intersect one of the sidewalls 34 at its narrow end 15. The sidewalls 34, 36 of the cavity 42 are bordered by surfaces of the interlayer dielectric layers 28, 30, 32, the dielectric layer 24, the dielectric layer 16, and the substrate 18.

The sidewalls 34 and the sidewalls 36 may extend from the rim of the cavity 42 to the bottom 41 of the cavity 42. The cavity 42 has a depth D that may be measured between the bottom 41 of the cavity 42 and the top surface 27 of the back-end-of-line stack 26. The sidewalls 34, 36 may be planar or substantially planar, and the sidewalls 34, 36 have a height that may be equal to the depth D of the cavity 42. The sidewalls 36, each of which has a length L1 in a direction transverse to the depth D, may have a surface area given by the product of the length L1 and the depth D. The length L1 of each sidewall 36 may be measured between the edges at the respective intersections with the adjacent pair of sidewalls 34. The sidewalls 34, each of which has a length L2, may have a surface area given by the product of the length L2 and the depth D. The length L2 of each sidewall 34 may be measured between the edges at the respective intersections with the adjacent pair of sidewalls 36. The length L2 of the sidewalls 34 may be greater than the length L1 of the sidewalls 36.

In an embodiment, each sidewall 36 is chamfered (i.e., diagonally angled) to extend between the edges at the respective intersections with the adjacent pair of sidewalls 34 and thereby define the non-right-angle internal corners 38 that are chamfered. The sidewalls 34 and the sidewalls 36 respectively intersect in the alternating arrangement at interior angles θ. In an embodiment, each interior angle θ may be greater than 90° and less than 180°. In the representative embodiment, each interior angle θ may be equal to about 135°. In an embodiment, all of the interior angles θ may be equal.

The lithographically-formed etch mask used when patterning the dielectric layer 16 and substrate 18 includes features that cover and mask strips of the dielectric layer 16 and substrate 18, which are preserved during patterning to define mechanical stops 44. The mechanical stops 44 project upwardly adjacent to opposite sidewalls 34 of the cavity 42. The mechanical stops 44 may provide passive and accurate alignment of a light source (e.g., a laser) that is inserted into the cavity 42. The cavity 42 is sized in depth and lateral dimensions in a plane transverse to the depth, as well as shaped, such that the light source can be inserted into the cavity 42 interior of the sidewalls 34, 36 and placed into contact with the mechanical stops 44.

Figure 6:
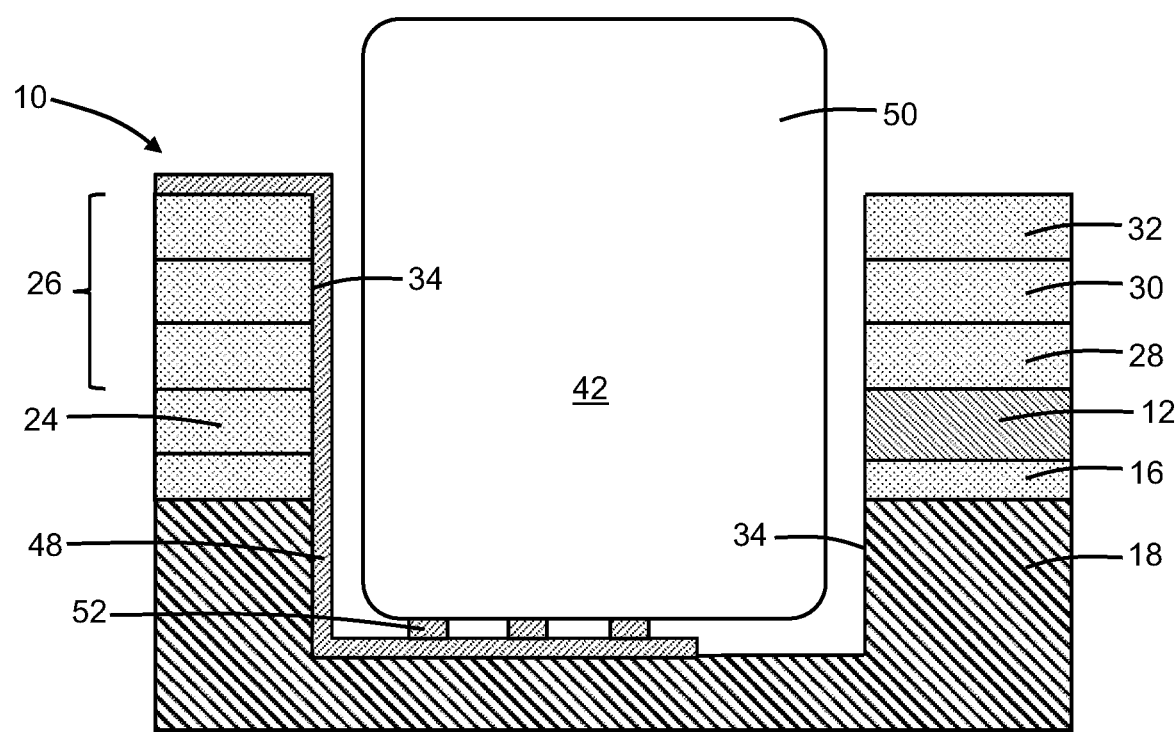
FIG. 6 is a cross-sectional view of the structure at a fabrication stage subsequent to FIG. 5.

With reference to FIG. 6 in which like reference numerals refer to like features in FIG. 5 and at a subsequent fabrication stage, a conductive trace 48 may be formed that leads from the bottom 41 of the cavity 42 up the sidewall 34 and onto the interlayer dielectric layer 32 at the top surface 27 of the back-end-of-line stack 26. A light source 50 may be placed into the cavity 42, and electrical connections 52 may be established between bottom contacts on the light source 50 and the conductive trace 48. In an embodiment, the light source 50 may be separately manufactured and may be attached by, for example, flip-chip bonding. The mechanical stops 44 assist with vertical alignment and seating of the light source 50 during attachment. The shape of the cavity 42 may be correlated with the shape of the light source 50, and the cavity 42 may be dimensioned to match the dimensions of the light source 50 such that the light source 50 can be inserted into the cavity 42 and successfully attached. In that regard, the dimensions of the cavity 42 may be greater than the dimensions of the light source 50 to provide clearances between the sides of the light source 50 and the sidewalls 34, 36 of the cavity 42 that promote the insertion and attachment of the light source 50.

The light source 50 is positioned in the cavity 42 such that the light output is aligned with the narrow end 15 of the inverse taper 14 of the waveguide core 12. The depth D of the cavity 42 and the height of the mechanical stops 44 may be adjusted to promote the alignment. In an embodiment, the light source 50 may be butt coupled with the narrow end 15 of the inverse taper 14 of the waveguide core 12. In an embodiment, the light source 50 may be a laser that is configured to emit laser light of a given wavelength, intensity, mode shape, and mode size. In an embodiment, the light source 50 may be a laser comprised of III-V compound semiconductor materials. In an embodiment, the light source 50 may be an indium phosphide/indium-gallium-arsenic phosphide laser that is configured to generate and output continuous laser light in an infrared wavelength range. For example, the laser providing the light source 50 may generate and output laser light at a nominal peak wavelength of 1310 nm or at a nominal peak wavelength of 1550 nm.

The structure 10, in any of its embodiments described herein, may be integrated into a photonics chip that includes electronic components and additional optical components. The electronic components may include, for example, field-effect transistors that are fabricated by complementary-metal-oxide-semiconductor processing using the device layer of the silicon-on-insulator substrate.

The non-right-angle internal corners 38 of the cavity 42 different from the right-angle internal corners of a conventional cavity. The non-right-angle internal corners 38 alleviate the internal stresses and strains in the substrate 18 and/or the back-end-of-line stack 26 that are otherwise be concentrated at the right-angle internal corners of a conventional cavity. The alleviation of concentrated stresses and strains provided by the non-right-angle internal corners 38 may function to reduce cracking and delamination that would otherwise lead to damage and catastrophic failure.

Figure 7:
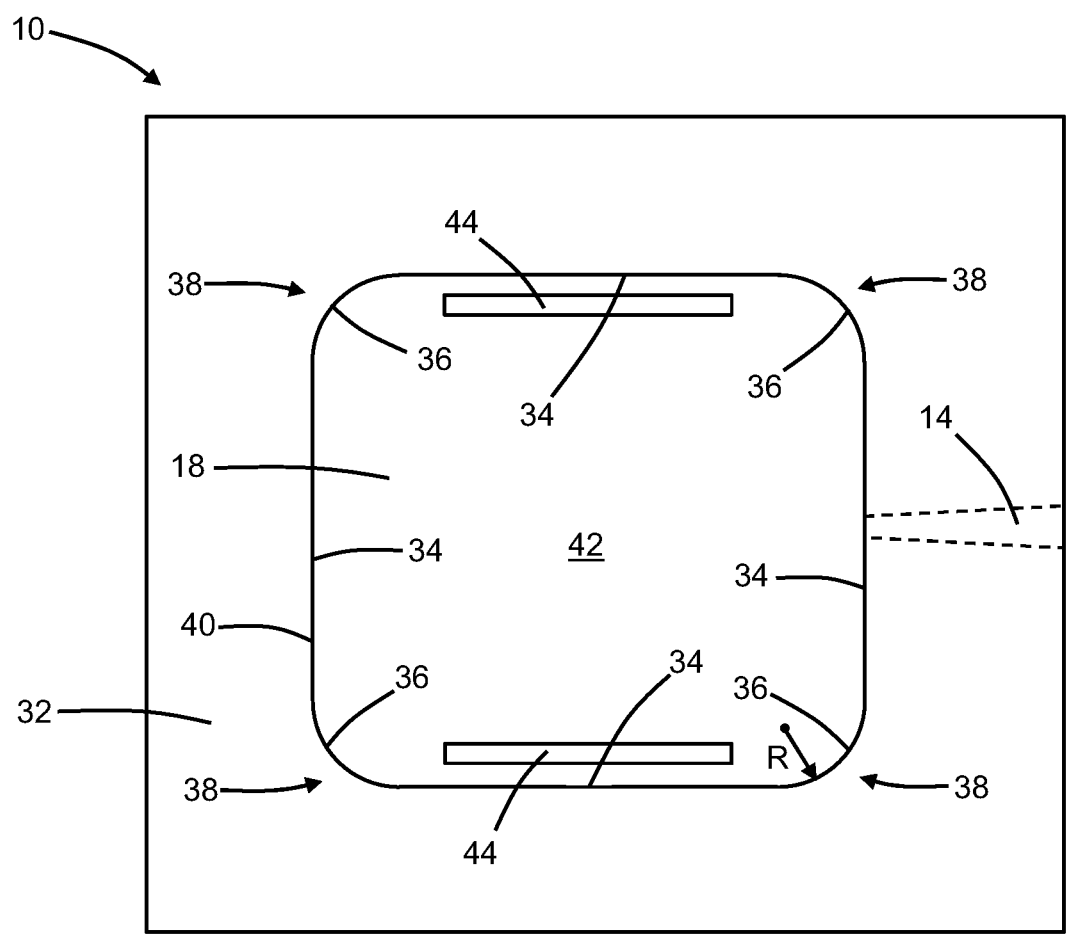
FIGS. 7 and 8 are top views of structures in accordance with alternative embodiments of the invention.

With reference to FIG. 7 in which like reference numerals refer to like features in FIG. 5 and in accordance with alternative embodiments, the sidewalls 36 may be curved or rounded such that each of the non-right-angle internal corners 38 is curved or rounded. Each rounded sidewall 36 is characterized by a curved surface that extends in an arc between respective edges of intersection with an adjacent pair of the sidewalls 34. The rounded sidewalls 36 have a curvature characterized by a given radius R. The rounded sidewalls 36 may be introduced by a design layout change in the etch mask(s) used to form the cavity 42.

Figure 8:
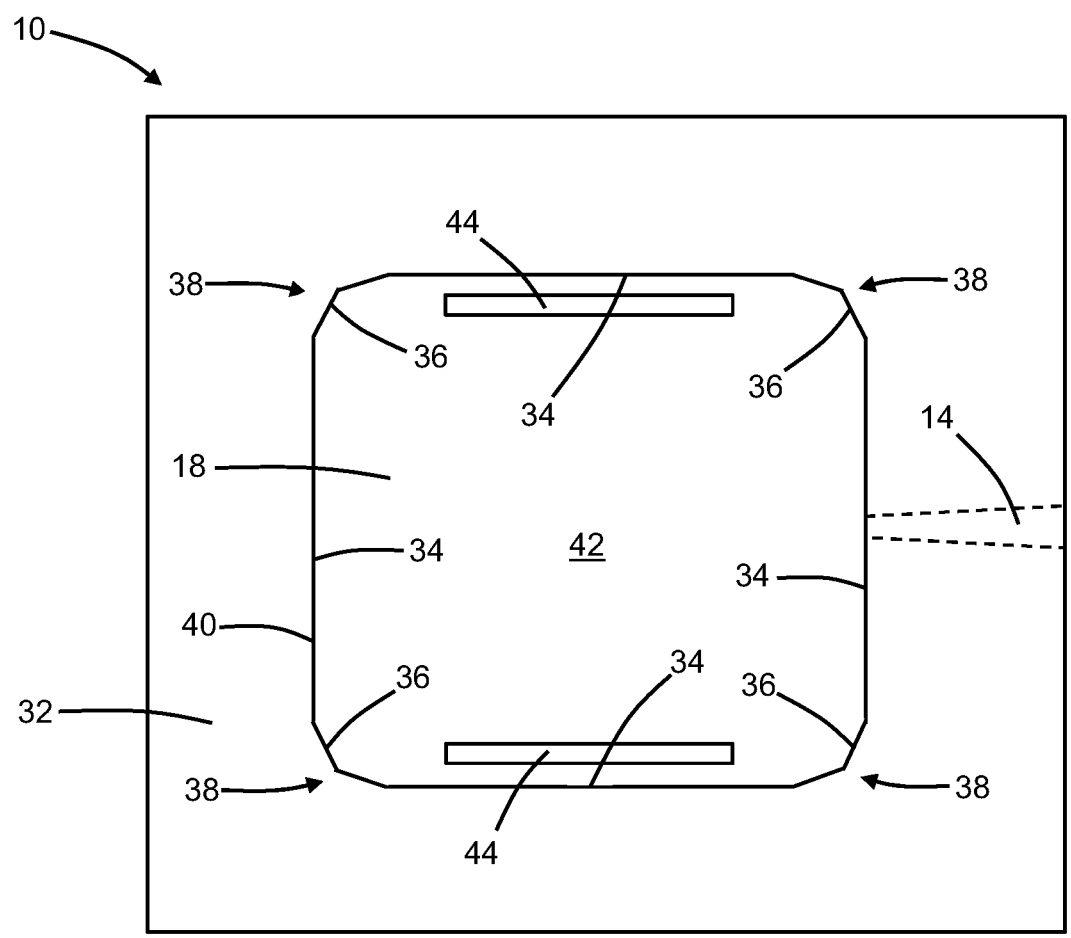

With reference to FIG. 8 in which like reference numerals refer to like features in FIG. 5 and in accordance with alternative embodiments, the sidewalls 36 may include multiple sidewall segments that are arranged to connect adjacent pairs of the sidewalls 34 to thereby define the non-right-angle internal corners 38. In an embodiment, the sidewall segments of each sidewall 36 may be planar, and the sidewall segments of each sidewall 36 may join at interior angles that are all greater than 90° and less than 180°.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may "overlap" if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a substrate;
a back-end-of-line stack including a plurality of interlayer dielectric layers on the substrate, the back-end-of-line stack having a top surface; and
a cavity in the back-end-of-line stack and the substrate, the cavity including a bottom in the substrate, a first plurality of sidewalls that penetrate from the top surface of the back-end-of-line stack to the bottom, and a second plurality of sidewalls that penetrate from the top surface of the back-end-of-line stack to the bottom, and the second plurality of sidewalls having an alternating arrangement with the first plurality of sidewalls to define a plurality of non-right-angle internal corners at respective edges between adjacent pairs of the first plurality of sidewalls and the second plurality of sidewalls.

2. The structure of claim 1 further comprising:
a waveguide core having an inverse taper positioned adjacent to the cavity.

3. The structure of claim 2 further comprising:
a first dielectric layer positioned in a vertical direction between the substrate and the back-end-of-line stack; and
a second dielectric layer positioned in the vertical direction between the first dielectric layer and the substrate,
wherein the waveguide core is embedded in the first dielectric layer, and the first plurality of sidewalls and the second plurality of sidewalls of the cavity penetrate through the first dielectric layer and the second dielectric layer.

4. The structure of claim 1 wherein each non-right-angle internal corner is chamfered.

5. The structure of claim 1 further comprising:
a light source inside the cavity,
wherein the first plurality of sidewalls and the second plurality of sidewalls of the cavity are shaped and dimensioned to receive the light source.

6. The structure of claim 5 wherein the light source is a laser comprising one or more III-V compound semiconductor materials.

7. The structure of claim 6 wherein the substrate comprises silicon.

8. The structure of claim 5 wherein the cavity includes a conductive trace, and the light source includes an electrical connection to the conductive trace.

9. The structure of claim 1 wherein the first plurality of sidewalls and the second plurality of sidewalls of the cavity are shaped and dimensioned to receive a light source.

10. The structure of claim 1 wherein the first plurality of sidewalls and the second plurality of sidewalls of the cavity are shaped and dimensioned to receive a laser comprising one or more III-V compound semiconductor materials.

11. The structure of claim 1 wherein each of the plurality of non-right-angle internal corners has an interior angle that is greater than 90° and less than 180°.

12. The structure of claim 11 wherein the cavity has a depth, each of the first plurality of sidewalls has a first length transverse to the depth, each of the second plurality of sidewalls has a second length transverse to the depth, and the second length is greater than the first length.

13. The structure of claim 11 wherein the interior angle of each the plurality of non-right-angle internal corners is equal to about 135°.

14. The structure of claim 1 wherein the plurality of non-right-angle internal corners have respective interior angles that are substantially equal.

15. A method comprising:
forming a back-end-of-line stack including a plurality of interlayer dielectric layers on a substrate, wherein the back-end-of-line stack has a top surface; and
patterning a cavity in the back-end-of-line stack and the substrate,
wherein the cavity includes a bottom in the substrate, a first plurality of sidewalls that penetrate from the top surface of the back-end-of-line stack to the bottom, and a second plurality of sidewalls that penetrate from the top surface of the back-end-of-line stack to the bottom, and the second plurality of sidewalls have an alternating arrangement with the first plurality of sidewalls to define a plurality of non-right-angle internal corners at respective edges between adjacent pairs of the first plurality of sidewalls and the second plurality of sidewalls.

16. The method of claim 15 wherein each non-right-angle internal corner is chamfered.

17. The method of claim 15 further comprising:
attaching a light source inside the cavity,
wherein the cavity is shaped and dimensioned to receive the light source.

18. The structure of claim 8 wherein the conductive trace leads from the bottom of the cavity up one of the first plurality of sidewalls and onto the top surface of the back-end-of-line stack.

19. The structure of claim 1 wherein the plurality of non-right-angle internal corners are configured to alleviate internal stresses and internal strains in the substrate or the back-end-of-line stack.

20. The structure of claim 1 wherein the first plurality of sidewalls are planar and intersect the bottom of the cavity at right-angle corners, and the second plurality of sidewalls are planar and intersect the bottom of the cavity at right-angle corners.

* * * * *